United States Patent
Wiegelmann et al.

(10) Patent No.: US 9,421,885 B2
(45) Date of Patent: Aug. 23, 2016

(54) ADJUSTABLE SEAT CUSHION ASSEMBLY

(71) Applicant: GM GLOBAL TECHNOLOGY OPERATIONS LLC, Detriot, MI (US)

(72) Inventors: Joerg Wiegelmann, Bodenheim (DE); Christine Suchy, Hochheim am Main (DE); Guenter Fleckenstein, Kleinkahl (DE)

(73) Assignee: GM GLOBAL TECHNOLOGY OPERATIONS LLC, Detroi, MI (US)

( * ) Notice: Subject to any disclaimer, the term of this patent is extended or adjusted under 35 U.S.C. 154(b) by 92 days.

(21) Appl. No.: 14/550,471

(22) Filed: Nov. 21, 2014

(65) Prior Publication Data

US 2015/0145302 A1      May 28, 2015

(30) Foreign Application Priority Data

Nov. 23, 2013   (DE) .................. 10 2013 019 823

(51) Int. Cl.
*B60N 2/02* (2006.01)
*B60N 2/62* (2006.01)
*A47C 1/023* (2006.01)

(52) U.S. Cl.
CPC .............. *B60N 2/0284* (2013.01); *A47C 1/023* (2013.01)

(58) Field of Classification Search
CPC ..... B60N 2/0284; A47C 1/023; A61G 5/1064
See application file for complete search history.

(56) References Cited

U.S. PATENT DOCUMENTS

| | | | | | |
|---|---|---|---|---|---|
| 4,773,703 | A | * | 9/1988 | Krugener | B60N 2/0284 297/284.1 |
| 5,171,062 | A | * | 12/1992 | Courtois | B60N 2/62 297/284.11 |
| 5,370,444 | A | * | 12/1994 | Stulik | A47C 1/023 297/284.11 |
| 2013/0320730 | A1 | * | 12/2013 | Aselage | B60N 2/0284 297/337 |

FOREIGN PATENT DOCUMENTS

| | | | |
|---|---|---|---|
| DE | 4104697 A1 | 8/1992 | |
| DE | 4114735 A1 | 11/1992 | |
| DE | 19726680 A1 * | 1/1999 | ........... B60N 2/0284 |
| DE | 19955296 C1 * | 2/2001 | ........... B60N 2/0284 |
| DE | 102008004121 A1 * | 7/2009 | ........... B60N 2/0284 |
| DE | 102008009440 A1 | 8/2009 | |
| DE | 102010007829 A1 | 11/2010 | |
| DE | 102010039027 A1 * | 2/2012 | ........... B60N 2/0284 |
| DE | 202012100770 U1 * | 5/2012 | ............. A47C 1/023 |
| DE | 102011120803 A1 * | 6/2013 | ........... B60N 2/5816 |
| GB | 2252723 A * | 8/1992 | .............. B60N 2/62 |
| JP | 06284940 A | 10/1994 | |
| JP | 2011225163 A | 11/2011 | |

\* cited by examiner

*Primary Examiner* — David R Dunn
*Assistant Examiner* — Tania Abraham
(74) *Attorney, Agent, or Firm* — Ingrassia Fisher & Lorenz PC

(57) ABSTRACT

An adjustable seat cushion assembly is disclosed which exhibits a first seat element and a second seat element moveable relative to the first seat element. A cover piece straddles a variable gap between cushion parts of the first and second seat elements. The adjustable seat cushion assembly is configured to draw the cover piece into the gap when the seat cushion assembly is moved from an extended position into a retracted position. A hem is formed with the cover piece in an area between the two cushion parts, and is joined with the second seat element. A link rod extends in the seat width direction of the cover piece and engages into slots at opposite ends.

7 Claims, 1 Drawing Sheet

ADJUSTABLE SEAT CUSHION ASSEMBLY

CROSS REFERENCE TO RELATED APPLICATION

This application claims priority to German Patent Application No. 102013019823.2 filed Nov. 23, 2013, which is incorporated herein by reference in its entirety.

TECHNICAL FIELD

The present disclosure relates to an adjustable seat cushion assembly, in particular for use in a motor vehicle seat.

BACKGROUND

Multiple adjustment options on a vehicle seat are known for enhancing the comfort of vehicle seats. One adjustment option here involves adjusting the seat depth with a seat depth adjusting device, which makes it possible to adjust the seat depth to the size of the person using the seat.

Adjustable seat cushion assemblies are here used that exhibit a first seat element and a second seat element that can be moved relative to the first seat element, with a cushion part being allocated to the respective seat element. The seat cushion assembly further exhibits a cover piece of a cushion cover that straddles a variable gap between the cushion parts. Finally, the seat cushion assembly can draw the cover piece into the gap. This takes place while switching the seat cushion assembly from an extended position of the cushion parts into a retracted position of the cushion parts. As a result, the gap between the two cushion seat elements that arises during adjustment into the extended position can be covered by the cover piece. If the second seat element has been completely retracted, i.e., the cushion parts are in their collapsed position, the cover piece has been drawn into the gap.

An adjustable seat cushion assembly designed in such a way is disclosed in DE 10 2010 007 829 A1. The retraction device of the latter has an elastic design, and includes an elastic band. The retraction device draws the cover piece along the gap and into it in the direction of a floor area of the gap.

SUMMARY

In accordance with the present disclosure an adjustable seat cushion assembly is provided that exhibits two seat elements movable relative to each other and a cover piece of a cushion cover that spans a variable gap between the cushion parts of the seat elements in such a way as to ensure that the gap is precisely covered by the cover piece given a structurally simple design. In the adjustable seat cushion assembly, a pulling mechanism includes a traction link coupled with cover piece in an area between the two cushion parts, and also with the second seat element, i.e., the seat element that can move relative to the first seat element. In the area of its end facing the cover piece, this pulling mechanism exhibits a link rod that extends in the seat width direction of the cover piece and engages into slots in the area of its opposite ends.

Therefore, the seat cushion assembly according to the present disclosure ensures a forced guidance of the pulling mechanism, and hence the cover piece, so that the cover piece folds together in a defined manner as the cushion parts are retracted. Thus, the cover piece is drawn into the gap, and the defined folded state arises for each intermediate position of the seat cushion assembly between the extended cushion elements and the retracted cushion parts. This applies correspondingly to the movement of cushion parts out of their retracted position into their extended position, thus giving an enlargement of the gap and the resultant controlled release of the cover piece based on the link motion.

The traction link is preferably designed as a hem and includes of two cover piece parts of the cover piece. The hem is formed by the one cover piece part allocated to the one cushion part, and the other cover piece part allocated to the other cushion part, which are sewn together. Excess segments of the two cover piece parts, regardless of what position the cushion parts assume in relation to each other, protrude into the area of the gap between the cushion parts. An actuator preferably engages the downwardly directed free end of the hem, and is rigidly secured to the second seat element. As a consequence, while adjusting the second seat element, and hence the cushion part allocated thereto, the actuator is concurrently moved accordingly, and the actuator acts on the hem or traction link, so that the cover piece is drawn into the gap to more or less of an extent depending on the position of the pulling mechanism. When the cushion parts are in the extended position, the cover piece directly bridges the gap between the cushion parts.

The respective slots preferably exhibits a first section arranged adjacent to a seat surface of the seat cushion assembly, and a second section adjoining the latter and inclined relative to the seat surface. The slot sections prescribes the travel path of the cover piece when drawing the cover piece into the gap. If the link rod is located in the area of the first slot section, the cushion parts are extended. When the cover piece is drawn into the gap, the link rod in the respective slots moves from the area of the first slot section into the adjacent second slot section adjoining the latter and inclined relative to the seat surface. The inclination prescribes the extent to which the cover piece is drawn into the gap. The steeper the slot is inclined, the greater the drawing-in movement of the cover piece in relation to the traveling movement of the cushion parts toward each other. It makes sense especially for the second slot section to be adjoined by a third slot section, which is arranged parallel to the seat surface. As the third slot section runs through, the cover piece drawn into the gap is slightly tightened a bit more. If such a third slot section is provided, then once the link rod has reached the end area of the third slot section, the two cushion parts abut against each other, i.e., are in their retracted position.

In particular, the slot sections are designed in such a way that the pulling mechanism supports the cover piece in the respective position of the second seat element while retracting and/or extending the cushion parts. It is regarded as especially advantageous from a structural standpoint for spacers exhibiting the slots to be situated on both sides of the seat cushion assembly. This permits a simpler configuration of the link motion, and hence an interaction between the link rod and slots.

In an another embodiment, it is possible to provide only one traction link, in particular an elastic traction mechanism, which is stationary in the area of one end, and joined with the cover piece in an area between the two cushion parts in the area of the end facing away from this end.

BRIEF DESCRIPTION OF THE DRAWINGS

The present disclosure will hereinafter be described in conjunction with the following drawing figures, wherein like numerals denote like elements.

DETAILED DESCRIPTION

Figure 1:
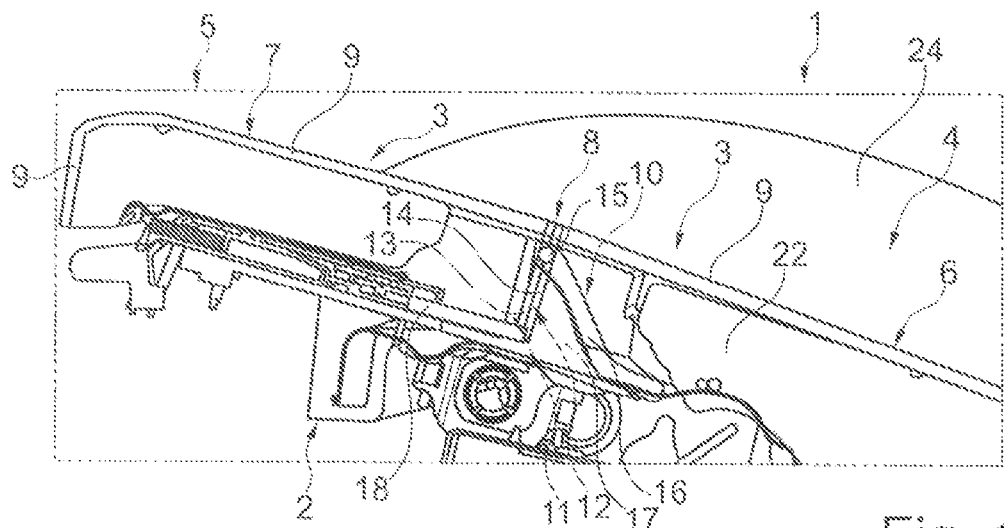
FIG. 1 for a partial cross section of a seat in the longitudinal direction of the vehicle and vertical direction of the vehicle showing the extended position of the cushion parts in an adjustable seat cushion assembly.

The following detailed description is merely exemplary in nature and is not intended to limit the present disclosure or the application and uses of the present disclosure. Furthermore, there is no intention to be bound by any theory presented in the preceding background or the following detailed description.

A vehicle seat 1, in particular for a seat of a passenger car, exhibits a frame structure 2 and a seat cushion 3 accommodated by the frame structure 2. Hinged to the frame structure 2 in the area of its rear end in relation to the forward traveling direction of the motor vehicle is another frame structure (not shown) allocated to a backrest (also not shown) of the vehicle seat 1.

The vehicle seat 1 exhibits an adjustable seat cushion assembly in the area of the seat cushion 3. The latter exhibits a first seat element 4, which is immovable relative to the frame structure 2, and a second seat element 5, which can be moved relative to the frame structure 2 and first seat element 4. The seat element 4 exhibits a cushion part 6, and the seat element 5 exhibits a cushion part 7. The seat cushion assembly further exhibits a cover piece 8 of a cushion cover 9. The cushion cover 9 covers the cushion parts 6 and 7 in the area of the seat cushion 3 facing the vehicle passengers. The cover piece 8 of the cushion cover 9 spans a variable gap 10 between the cushion parts 6 and 7. A pulling mechanism 11 which serves to draw the cover piece 8 into the gap 10 when the seat cushion assembly is moved from an extended position of the cushion parts 6, 7 (FIG. 1) through an intermediate position of the cushion parts 6, 7 (FIG. 2) and into a collapsed position of the cushion parts 6, 7 (FIG. 3).

In an area between the two cushion parts 6 and 7, the cover piece 8 is provided with a traction link 12, which is formed as a hem of two portions 13, 14 of the cover piece 8. In the area of its end facing the cover piece 8, the traction link 12 exhibits a link rod 15 extending in the seat width direction of the cover piece 8. In the area of its opposite ends, the link rod 15 engages into a slot 16 formed in seat cushion spacers 17 which are arranged on each sides of the seat cushion assembly.

In the area of the end facing away from the cover piece 8, the traction link 12, i.e., the hem, is coupled to an actuator 18 which is rigidly secured with the seat element 5. When the seat element 5 is moved relative to the seat element 4, the actuator 18 thus moves accordingly, and acts on the traction link 12.

The seat surface of the vehicle seat 1 is thus formed by the surface of the cushion cover 9. The slot 16 exhibits a first section 19 situated adjacent to the seat surface of the seat, and hence the seat cushion assembly, a second section 20 adjoining the first slot section and inclined relative to the seat surface, and a third section 21 adjoining the second slot section and parallel to the seat surface. As a consequence, the traction link 12 engages the cushion cover 9 in the area of the cover piece 8 and the actuator 18 and is guided adjacent to where the traction link 12 is joined with the cushion cover 9 into the wings 16 via the link rod 15. When the two cushion parts 6, 7 of the cover piece 8 are extended or retracted, the cover piece 8 is forced to move as a function of the displacement of the link rod 15 in the slot 16.

Figure 2:
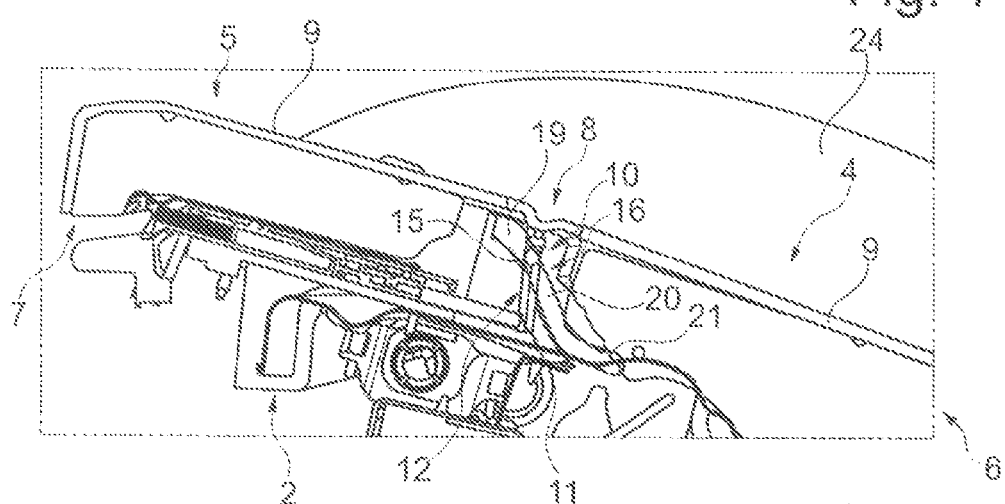
FIG. 2 is a corresponding sectional view of the seat according to FIG. 1 for a partially retracted state, i.e., an intermediate position of the seat cushion assembly.
Figure 3:
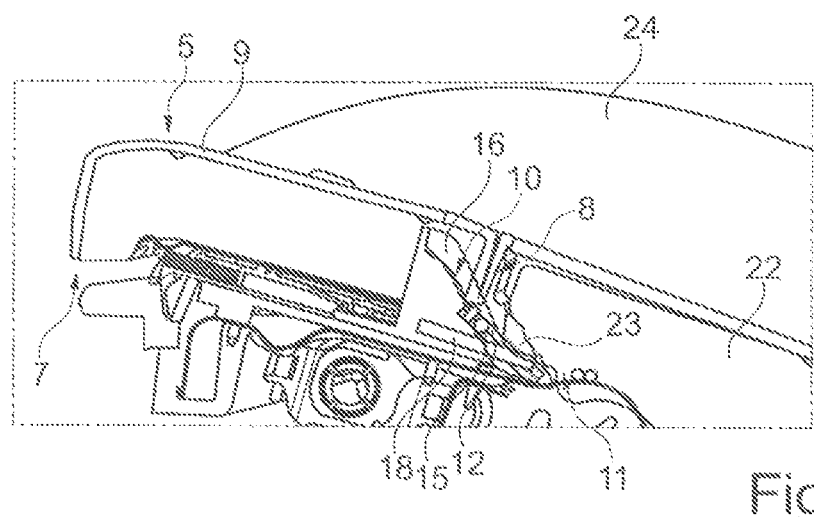
FIG. 3 is a corresponding sectional view of the seat according to FIG. 1 for the fully retracted position of the cushion parts.

This is illustrated on FIGS. 1 to 3. FIG. 1 shows that the cover piece 8 is tightened with the cushion parts 6 and 7 in an extended position, and thereby joins the two cushion parts 6 and 7 as a flat surface in the area of their cushion cover 9. In this extended position of the cushion parts 6 and 7, the link rod 15 is located in the end area of the wings 16 that faces the seat surface of the vehicle seat 1. When retracting the cushion parts 6 and 7, i.e., moving the seat element 5 toward the seat element 4, the free end of the actuator 18 is also displaced in the direction of the seat element 4, and acts on the traction link 12 or hem. The link rod 15 is moved along the slot 16 downwardly at an inclination, so that the cover piece 8 is to some extent drawn into the gap 10 formed between the cushion parts 6 and 7. With the continued retraction of the cushion parts 6 and 7, the actuator 18 is displaced further, and thereby draws the cover piece 5 further into the gap by way of the traction link 12, until the end state illustrated on FIG. 3, wherein the retracted cushion parts 6 and 7 has been reached. In this end state, the link rod 15 is either still located in the second slot section 20 inclined relative to the seat surface, or has been moved into the third slot section 21. The cover piece 8 shown here has been collapsed and drawn completely into the gap 10. This movement of the actuator 18 and traction link 12 into the end position in the retracted position of the cushion parts 6 and 7 is possible because a cushion foam 22 of the seat element 5 has been provided with a clearance 23, so that space is there available for the actuator 18 and traction link 12.

When the cushion parts 6 and 7 are extended out of the retracted position of the cushion parts 6, 7, the actuator 18 is displaced in the opposite direction, and the cushion part 7 draws the cover piece 8 out of the gap 10, during the subsequent movement by the traction link 12 and link rod 15 into the slot 16. The geometric conditions are selected so as to adjust the link motion, and hence the movement of the link rod 15, to the required movement of the cover piece 8, so as to hold the latter slightly tensioned between the cushion parts 6, 7.

Since the movement of the cover piece 8 is controlled by the movement of the seat element 5, this can be done manually. As a consequence, it does not require an electric drive. This enables a very cost-effective configuration. The cushion cover 8 can be held tightly between the cushion parts 6 and 7 for all latched positions of the seat element 5. The link motion ensures that the cover piece 8 is under a tension when moved and folded together. When retracting the seat depth adjuster, the cover piece 8 is drawn into the gap 10 in a defined manner, and the cover piece 8 is folded in the clearance between the cushion foam 22 and seat shell.

The right side of a side cushion of the vehicle seat 1 is illustrated with reference number 24. The vehicle seat 1 exhibits a corresponding side cushion on the left side which is not shown. While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. An adjustable seat cushion assembly comprising:
a first seat element having a first cushion part;
a second seat element movable relative to the first seat element between a retracted position and an extended position, the second seat element having a second cushion part;
a cover piece of a cushion cover that straddles a variable gap between the first and second cushion parts; and
a pulling mechanism configured to draw the cover piece into the variable gap when the second seat element is moved from the extended position to the retracted position, the pulling mechanism includes a traction link coupled to cover piece in an area between the first and second cushion parts and joined with the second seat element and a link rod extending in a seat width direction of the cover piece, coupled to the fraction link and engaging a guide slot on an end of the link rod.

2. The adjustable seat cushion assembly according to claim 1, wherein the traction link comprises a hem formed by two portions of the cover piece.

3. The adjustable seat cushion assembly according to claim 1, wherein the guide slot comprises a first slot section arranged adjacent to a seat surface of the seat cushion assembly, and a second slot section adjoining the first slot section and inclined relative to the seat surface.

4. The adjustable seat cushion assembly according to claim 3, wherein the guide slot further comprises a third slot section arranged parallel to the seat surface and adjoining the second slot section.

5. The adjustable seat cushion assembly according to claim 1, wherein the guide slot is designed in such a way that the traction link supports the cover piece in the respective position of the seat element via the guide slot while moving the cushion parts.

6. The adjustable seat cushion assembly according to claim 1 further comprising an actuator secured to the second seat element, wherein a portion of the traction link facing away from the cover piece is coupled to the actuator.

7. The adjustable seat cushion assembly according to claim 1 further comprising a seat cushion spacer situated on each side of the first seat element and the guide slot formed therein.

* * * * *